Sept. 10, 1929.  C. M. CONRADSON  1,727,535
CHUCK
Filed Sept. 13, 1926  2 Sheets-Sheet 1
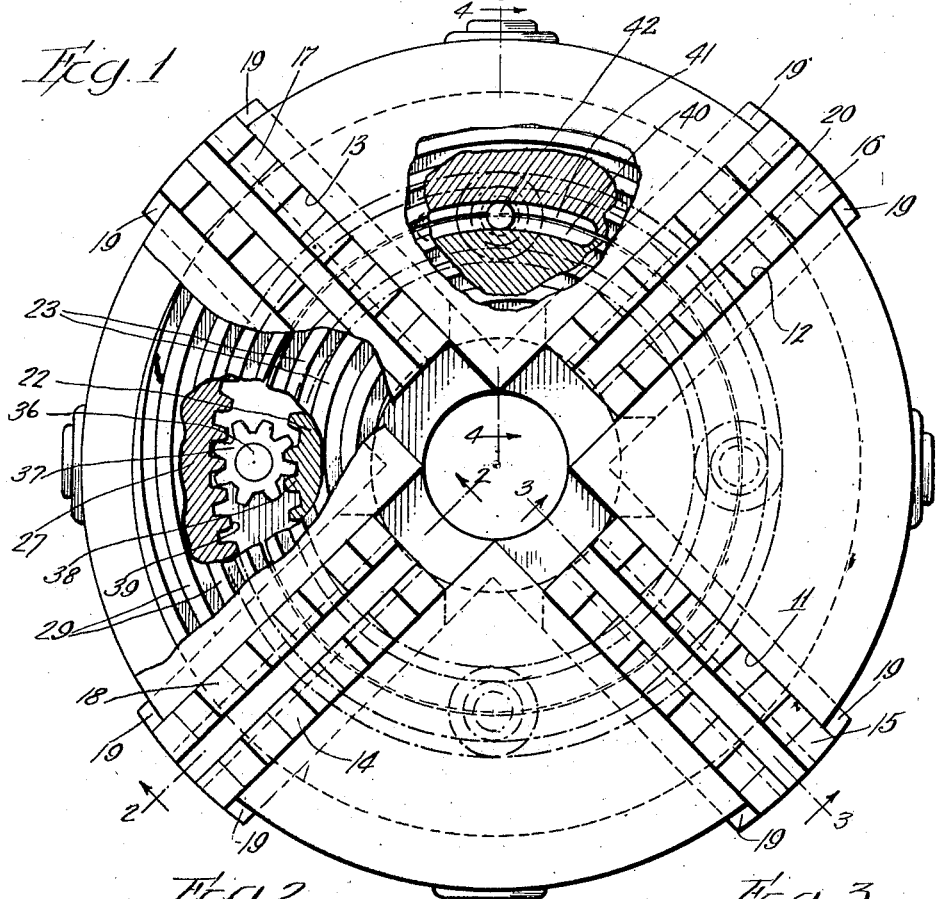
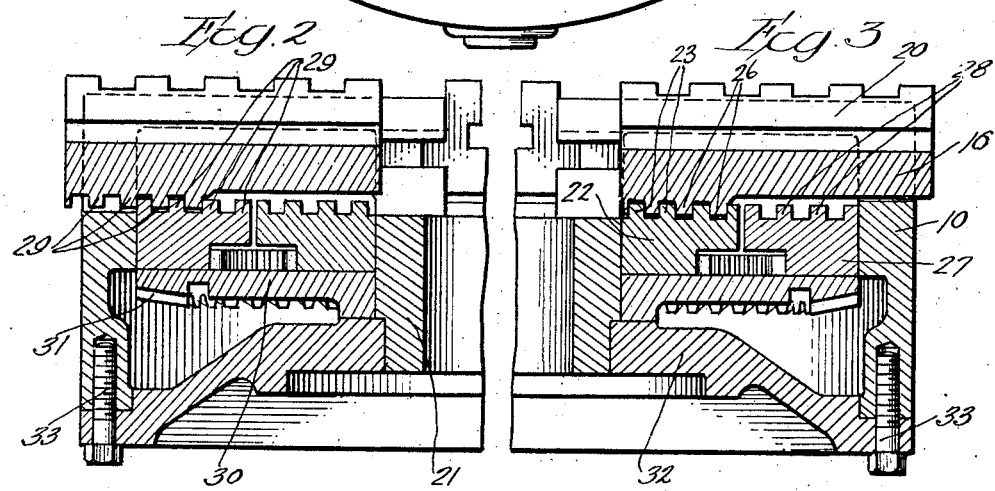
Inventor:
Conrad M. Conradson
By Nissen & Crane
Attys.

Sept. 10, 1929.   C. M. CONRADSON   1,727,535
CHUCK
Filed Sept. 13, 1926   2 Sheets-Sheet 2

Inventor.
Conrad M. Conradson
By Nissen & Crane
Attys.

Patented Sept. 10, 1929.

1,727,535

UNITED STATES PATENT OFFICE.

CONRAD M. CONRADSON, OF GREEN BAY, WISCONSIN.

CHUCK.

Application filed September 13, 1926. Serial No. 134,999.

This invention relates to chucks for holding work for machine tools such as lathes, and has for its object the provision of a chuck having a plurality of pairs of jaws which may be operated simultaneously and which will produce substantially equal clamping force on the object held by the chuck even though the object may be irregular in shape, the work being accurately centered by the jaws.

Other objects will appear from the following description.

The invention is exemplified in the combination and arrangement of parts shown in the accompanying drawings and described in the following specification, and it is more particularly pointed out in the appended claims.

In the drawings:—

Fig. 1 is a face view of the chuck parts broken away to show the construction of the adjustment members;

Fig. 2 is a section on line 2—2 of Fig. 1;

Fig. 3 is a section on line 3—3 of Fig. 1;

Figure 4:
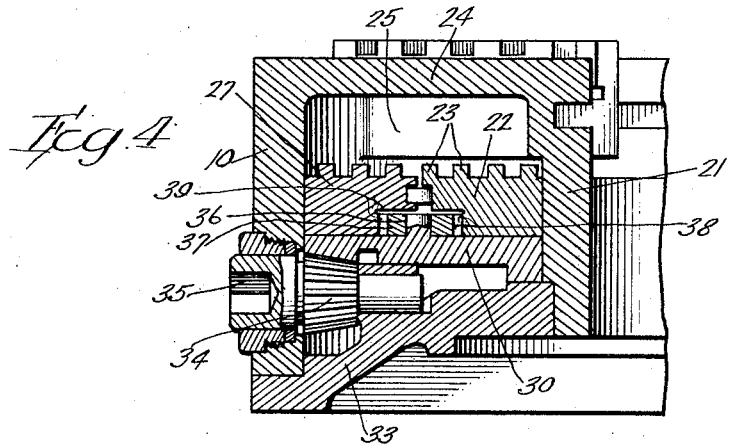
Fig. 4 is a section on line 4—4 of Fig. 1.

The chuck comprises a disc-shaped body portion 10 having slideways 11, 12, 13 and 14, formed in the face thereof for receiving sliding jaws 15, 16, 17 and 18, respectively. The jaws are provided with flanges 19 which extend into undercut grooves at the sides of the slideways. Each of the jaws is provided with a T-slot 20 to which false jaws of any desired form may be secured. The disc-shaped body member 10 is provided with a central hollow cylindrical boss 21 upon which a scroll disc 22 is journaled, the disc being provided with spiral teeth 23 on the face thereof adjacent the jaw members. As shown in Fig. 4, the body 10 is provided with a face plate 24 and inwardly projecting webs 25 at each side of the jaw members, forming the guides for the jaw members. The guides are open at their inner sides and the jaw members 16 and 18 are provided with rack teeth 26 which extend into the space about the boss 21 and engage the spiral teeth on the disc 22. Extending about the periphery of the scroll plate 22 is a second scroll plate 27 provided with spiral teeth 28 and, as shown in Fig. 2, the jaws 15 and 17 are provided with teeth 29 which mesh with the teeth 28 of the scroll plate 27. It will be apparent that rotation of the scroll 22 will move the pair of jaws 16 and 18 simultaneously toward or away from each other, depending upon the direction of rotation of the scroll and that likewise, rotation of the scroll 27 will operate the other pair of jaws 15 and 17 in a similar manner. A disc 30 is journaled on the boss 21 in contact with the rear faces of the scrolls 22 and 27, the rear face of the disc 30 being provided with beveled gear teeth 31 adjacent the outer periphery of the disc. A cover plate 32 is secured to the body member 10 by cap screws 33 to hold the disc 30 in place on the boss 21. One or more pinions 34 are journalled in the disc 32 and the side wall of the body member 10 and mesh with the gear teeth 31, as shown in Fig. 4. The spindle of the pinion 34 is provided with an angular socket 35 for receiving a suitable wrench to rotate the pinion. The gear wheel 30 carries a stud 36 on which a pinion 37 is journalled. The pinion meshes with spur gear teeth 38 on the scroll 22 and with internal spur gear teeth 39 on the scroll 27. When the pinion 34 is rotated to drive the gear wheel 30, the stud 36 will carry the pinion 37 about the boss 21 and so long as the jaw members move freely, the scrolls 22 and 27 will move together and the jaw members will all be fed uniformly toward the center of the chuck. If an irregular piece of work is disposed within the jaws, one of the pairs of jaws will engage the work prior to the other pair and further movement of the first pair of jaws will be arrested. This will prevent further rotation of one of the scrolls so that further movement of the gear 30 will cause the pinion 37 to rotate upon its stud shaft 36 and drive the second scroll at an increased rate of speed, thus feeding the second pair of jaws inwardly until they are in engagement with the piece of work. When both pairs of jaws are in contact with the work, further rotation of the pinion 34 and gear 30 will tighten both pairs of jaws simultaneously against the work although the work may be irregular in shape.

In order that the pairs of jaws may not be unduly displaced relative to each other, the adjacent edges of the scrolls 22 and 27 are provided with registering grooves 40 and 41 respectively, and a roller 42 is disposed in these grooves, as shown in Figs. 1 and 4, to limit the relative rotation of the scrolls 22 and 27. The gears 38 and 39 and the pinion 37 form an equalizing planetary gear system which tends to equalize the force exerted by the scrolls on the pairs of jaws.

Figure 6:
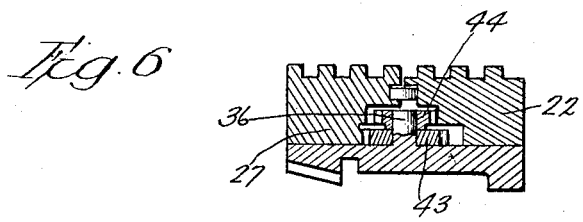
Fig. 6 is a fragmentary sectional view showing a different modification of gearing.

Owing to the slight difference in the pitch diameter of the gear teeth on the scrolls 22 and 27, there will be a slight difference in the pressure exerted on the two sets of jaws. It will be understood that the term "equalizing", as used in the specification and claims, is not restricted to a construction in which the forces are made exactly equal but applies to constructions such as that shown in Fig. 4, where the arrangement distributes the force between the different pairs of jaws, tending to equalize these forces. In ordinary practice, the slight difference in pressure, referred to above, is immaterial but it may be avoided by providing two pinions 43 and 44 journaled on the stud 36, as shown in Fig. 6. If the pinion 43 has the same ratio to the teeth of the scroll 27 as that of the pinion 44 to the teeth of the scroll 22, equal pressure will be exerted on the two sets of jaws. As an example, the smaller pinion may have a pitch diameter of 2.4 inches and mesh with teeth on the scroll 22 having a pitch diameter of 9.6 inches, giving a ratio of 1 to 4. The other pinion 43 would then have a diameter of 4 inches while the pitch diameter of the teeth on the scroll 27 would be 16 inches. Of course, other ratios may be used so long as the ratio of each pinion to its scroll is the same as the other pinion to its scroll.

Figure 5:
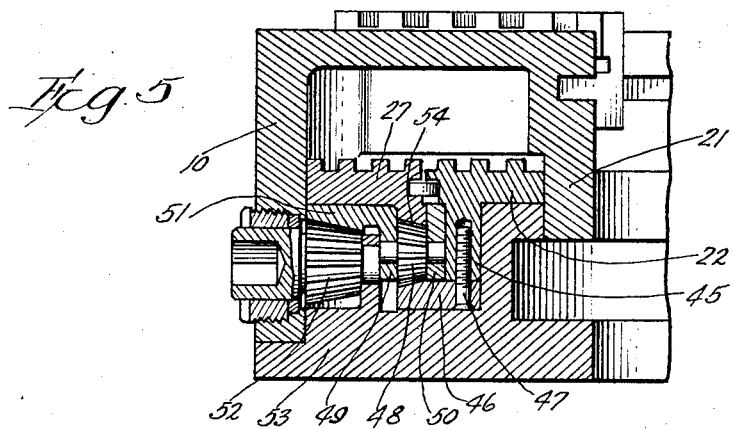
Fig. 5 is a a view similar to Fig. 4 but showing a modified construction.

In the modification shown in Fig. 5, the inner scroll 22 is provided with a downwardly extending flange 45 to which a ring 46 is secured by screws 47. The outer edge of the ring 46 is provided with beveled gear teeth which mesh with one or more beveled pinions 48 which are journaled in flanges 49 and 50 carried on a beveled gear 51 which rotates about the flange 45 on the inner scroll 22. The beveled gear 51 is driven by one or more beveled pinions 52 journaled in the side flange of the body portion 10 and in bearing members extending upwardly from the cover plate 53. The outer scroll 27 is provided with a flange 54 which meshes with the pinion 48. It will be apparent that the pinion 48 operates on the same radius for both scrolls so that equal forces will be exerted by both pairs of jaws with this arrangement.

I claim:—

1. A work-holding chuck comprising a plurality of substantially coplanar pairs of jaws, means for closing the jaws of each pair simultaneously, and an equalizing drive interposed between the closing means for the said different coplanar pairs of jaws.

2. A work-holding chuck comprising a supporting block, two substantially coplanar pairs of diametrically opposed jaws mounted to slide in said supporting block, separate drives for each pair of jaws arranged to move the jaws of each pair simultaneously toward each other and a pressure equalizing connection between the drives for said pairs of jaws.

3. A work-holding chuck comprising a supporting block, two substantially coplanar pairs of opposed jaws mounted to slide toward each other in said block, separate drives for said pairs of jaws, and a common operating device for said drives operating as an equalizer between said pairs of jaws.

4. A work-holding chuck comprising a supporting block, two substantially coplanar pairs of jaws mounted to move radially in said block toward a common center, the directions of movement of the jaws of the two pairs being normal to each other, separate drives for said jaws arranged to move the jaws of each pair at the same rate toward said common center, and equalizing means for operating said drives to permit the jaws of either pair to continue to move after the jaws of the other pair have engaged a piece of work.

5. A work-holding chuck comprising a supporting block, a plurality of substantially coplanar pairs of jaws slidably mounted in said block, a separate scroll for operating the jaws of each pair and pressure equalizing gearing interposed between said scrolls.

6. A work-holding chuck comprising a plurality of substantially coplanar pairs of jaws, separate drives for said pairs of jaws, and planetary gearing connecting said drives for equalizing the pressure exerted by said pairs of jaws.

7. A work-holding chuck comprising a plurality of substantially coplanar pairs of jaws, a separate scroll for operating the jaws of each pair, said scrolls being mounted for rotation independently of each other and a planetary gear drive for said scrolls.

8. A work-holding chuck comprising a plurality of substantially coplanar pairs of jaws, a separate scroll for driving the jaws of each pair, a rotary member having a pinion journalled thereon, and gear teeth formed on said scrolls and meshing with said pinion.

9. A work-holding chuck comprising a support having a plurality of substantially coplanar pairs of jaws slidably mounted therein and movable toward and from a common center, concentrically disposed scroll plates for operating said jaws, the jaws of each pair having teeth thereon meshing with a common scroll plate.

10. A work-holding chuck comprising a supporting block having a plurality of substantially coplanar pairs of jaws slidably mounted therein, concentric scroll plates for operating said jaws, the jaws of each pair having teeth meshing with the teeth on a common scroll plate, and planetary gearing for driving said scroll plates and for equalizing the pressure exerted by said scroll plates on said pairs of jaws.

11. A work holding chuck comprising a supporting block, a plurality of substantially coplanar pairs of jaws slidably mounted in said block to move toward and away from a common center, a plurality of scroll plates mounted to rotate in said block, a gear wheel mounted to rotate concentrically with said scroll plates, a pinion mounted on said gear wheel and meshing with gear teeth on said scroll plates to form a planetary gear system for operating said scroll plates to drive said jaws and to equalize the pressure exerted by said jaws, means for limiting the relative displacement of said scroll plates, and a pinion accessible from the side of said chuck for driving said gear system.

12. A work-holding chuck comprising a supporting block, a plurality of pairs of jaws mounted to slide toward a common center on said block, a pair of concentric scroll plates mounted to rotate in said block about an axis passing through said common center, teeth on the jaws of one of said pairs meshing with the inner one of said scroll plates, teeth on the jaws of another of said pairs meshing with the outer one of said scroll plates, a gear mounted to rotate about the axis of said scroll plates, a pinion journaled on said gear, gear teeth on said scroll plates meshing with said pinion, and a beveled pinion for rotating said gear, said beveled pinion having a shaft fixed thereto and projecting from the side of said chuck to receive a tool for rotating said pinion and operating the jaws of said chuck.

In testimony whereof I have signed my name to this specification on this 9th day of September, A. D. 1926.

CONRAD M. CONRADSON.